United States Patent
Wang et al.

(10) Patent No.: US 11,917,543 B2
(45) Date of Patent: Feb. 27, 2024

(54) BLUETOOTH-BASED DATA TRANSMISSION METHOD AND DATA RECEIVING METHOD, COMMUNICATING APPARATUS AND COMPUTER STORAGE MEDIUM

(71) Applicant: MediaTek Singapore Pte. Ltd., Singapore (SG)

(72) Inventors: Yili Wang, Chengdu (CN); Zhiyong Zhang, Chengdu (CN); Enhong Zhu, Chengdu (CN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 225 days.

(21) Appl. No.: 17/488,999

(22) Filed: Sep. 29, 2021

(65) Prior Publication Data
US 2022/0104131 A1 Mar. 31, 2022

(30) Foreign Application Priority Data
Sep. 30, 2020 (CN) .......................... 202011059897.7

(51) Int. Cl.
*H04L 1/08* (2006.01)
*H04W 52/02* (2009.01)
*H04W 76/10* (2018.01)
*H04W 4/80* (2018.01)

(52) U.S. Cl.
CPC ........... *H04W 52/0232* (2013.01); *H04L 1/08* (2013.01); *H04W 4/80* (2018.02); *H04W 76/10* (2018.02)

(58) Field of Classification Search
CPC ............ H04W 4/80; H04W 76/10; H04L 1/08

USPC ................ 370/329, 400, 401, 395
See application file for complete search history.

(56) References Cited

U.S. PATENT DOCUMENTS

| 9,986,522 B2 | 5/2018 | Schmandt et al. |
| 2004/0165576 A1* | 8/2004 | Reunamaki ............ H04L 7/041 370/350 |

FOREIGN PATENT DOCUMENTS

CN    103368598 B    9/2016

OTHER PUBLICATIONS

Chinese language office action dated Jun. 30, 2021, issued in application No. TW 109145467.

* cited by examiner

*Primary Examiner* — Dang T Ton
(74) *Attorney, Agent, or Firm* — McClure, Qualey & Rodack, LLP

(57) ABSTRACT

A Bluetooth-based data transmission method is provided. The method is applied on a first device and includes the following steps: establishing a communication connection with a second device; determining a sniff interval which comprises a sniff wake-up window; entering a sniff mode; and transmitting a first data packet to the second device in the sniff interval. The transmission duration of the first data packet is longer than or equal to two time slots. The step of transmitting the first data packet to the second device in the sniff interval includes the steps of starting to transmit the first data packet to the second device in an even time slot of the sniff interval or in an odd time slot of the sniff interval. With the data transmission method of the present application, synchronization between transmission of the first device and reception of the second device can be realized.

18 Claims, 13 Drawing Sheets

BLUETOOTH-BASED DATA TRANSMISSION METHOD AND DATA RECEIVING METHOD, COMMUNICATING APPARATUS AND COMPUTER STORAGE MEDIUM

CROSS REFERENCE TO RELATED APPLICATIONS

This application claims priority of China Patent Application No. 202011059897.7, filed on Sep. 30, 2020, the entirety of which is incorporated by reference herein.

BACKGROUND OF THE INVENTION

Field of the Invention

The invention relates to a field of mobile communication technology, and in particular to a Bluetooth-based data transmission method, receiving method, communication device, and computer storage medium.

Description of the Related Art

Bluetooth is widely used in smart speakers, home entertainment devices, and personal media devices. When playing high-quality audio via Bluetooth, Bluetooth A2DP (Advanced Audio Distribution Profile) is generally required.

In actual usage scenarios, an electronic device often needs to be connected to multiple devices of the same type or different types at the same time. In addition to the Bluetooth connection, there may be other wireless connections such as WiFi connection and LTE connection. The existing A2DP transmission protocol is mainly aimed at the data transmission situation that an electronic device is connected to a single Bluetooth device. It cannot solve the problem of transmission synchronization when the electronic device is connected to multiple communication devices. The problem may cause the Bluetooth device to receive and send data packets incompletely or unsuccessfully, while simultaneously using up more bandwidth resources in the transmission link.

BRIEF SUMMARY OF THE INVENTION

Embodiments of the invention provide a Bluetooth-based data transmission method, receiving method, communication device, and computer storage medium. The main technical problem to be solved is how to solve the problem of synchronization of transmission when an electronic device is connected to multiple communication devices.

An exemplary embodiment of a Bluetooth-based data transmission method is provided. The Bluetooth-based data transmission method is applied on a first device. The method comprises steps of establishing a communication connection with a second device; determining a sniff interval and transmitting indication information of the sniff interval to the second device; entering a sniff mode; transmitting a data packet to the second device in the sniff interval. The transmission duration of the data packet is longer than or equal to two time slots. The step of transmitting the data packet to the second device in the sniff interval comprises starting to transmit the data packet to the second device in an even time slot of the sniff interval; or starting to transmit the data packet to the second device in an odd time slot of the sniff interval.

The step of starting to transmit the data packet to the second device in the even time slot of the sniff interval comprises starting to transmit a first data packet to the second device at an anchor point of the sniff interval.

An exemplary embodiment of a Bluetooth-based data receiving method is provided. The method may involve a second device establishing a communication connection with a first device and receiving a notification message transmitted by the first device, wherein the notification message comprises indication information of a sniff interval. The method may also involve the second device entering the sniff mode and receiving a data packet transmitted by first device in the sniff interval, wherein the transmission duration of the data packet is longer than or equal to two time slots. The step of receiving the data packet transmitted by the first device in the sniff interval comprises starting to receive the data packet transmitted by the first device in an odd time slot of the sniff interval; or starting to receive the data packet transmitted by the first device in an even time slot of the sniff interval.

The step of starting to receive the data packet transmitted by the first device in the odd time slot of the sniff interval comprises starting to receive a first data packet transmitted by the first device at an anchor point of the sniff interval.

One exemplary embodiment of a communication device is provided. The communication device comprises a transceiver and a processor. The transceiver establishes a communication connection with a second device. The processor determines a sniff interval, transmits indication information of the sniff interval to the second device through the transceiver, enters a sniff mode, and starts to transmit a data packet to the second device in an even time slot of the sniff interval or starts to transmit the data packet to the second device in an odd time slot of the sniff interval. The transmission duration of the data packet is longer than or equal to two time slots.

Another exemplary embodiment of a communication device is provided. The communication device comprises a transceiver and a processor. The transceiver establishing a communication connection with a first device. The processor receives a notification message transmitted by the first device through the transceiver, enters a sniff mode, and starts to receive the data packet which is transmitted by the first device in an odd time slot of the sniff interval or starts to receive the data packet which is transmitted by the first device in an event time slot of the sniff interval. The notification message comprises indication information of the sniff interval. The transmission duration of the data packet is longer than or equal to two time slots.

An exemplary embodiment of a computer storage medium is provided. The computer storage medium is configured to store program instructions that cause a processor to execute the aforementioned Bluetooth data transmission method or the aforementioned Bluetooth data receiving method.

Based on the above embodiments, the data transmission method of the present application is performed by starting to transmit a data packet whose transmission duration is longer than or equal to two time slots to the second device in an even or odd time slot of the sniff interval, thereby realizing the synchronization of transmission and reception between electronic devices.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art.

In addition to A2DP, current transmission protocols comprise various transmission protocols, such as HFP (Handsfree Profile), HID (Human Interface Device Profile), OPP (Object Push Profile), HOGP (HID Over GATT Profile), are used in various smart devices and usage scenarios. Devices of different types can complete data transmission through above-mentioned different transmission protocols or the same transmission protocol.

In practical scenarios, an electronic device often needs to be connected to multiple different devices at the same time and uses multiple different transmission protocols at the same time, which is often referred to as multi-link. If one of the two devices that need to receive or transmit A2DP audio data may be processing other transmission tasks, receiving/transmitting the A2DP audio data packets is unsuccessful, which occupies more bandwidth and affects the performance of Bluetooth transmission.

Figure 1:
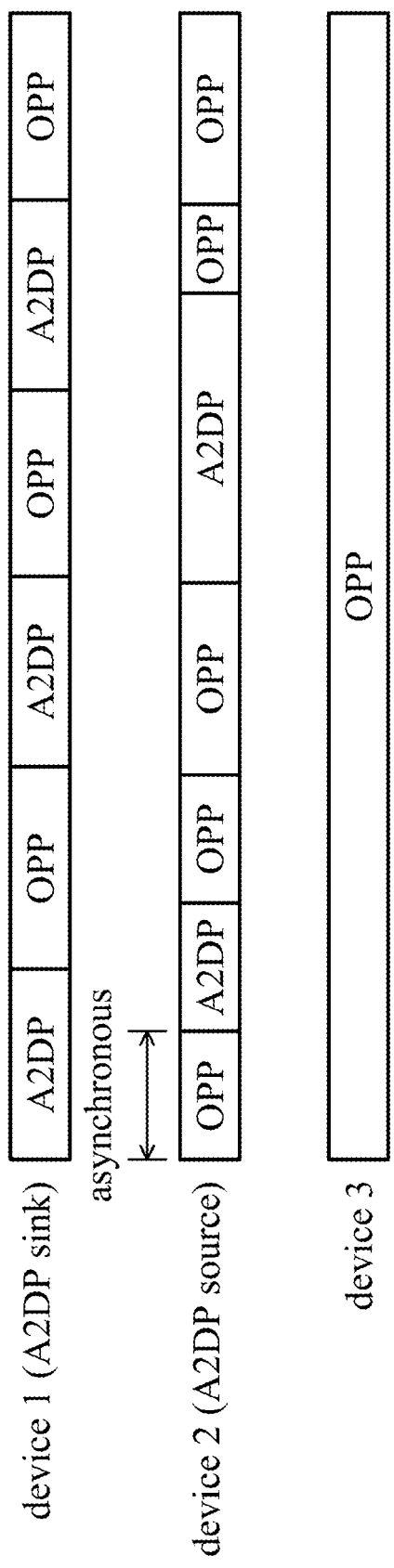
FIG. 1 is a timing diagram of multi-link transmission in the prior art.

Please refer to FIG. 1, a timing diagram of multi-link transmission in the prior art is shown. In FIG. 1, the device 2 is an electronic device, the device 1 is a Bluetooth device connected to the electronic device, and the device 3 is another device connected to the electronic device. The Bluetooth device communicates with the electronic device through the A2DP transmission protocol. The electronic devices can be referred to as "A2DP source", and the Bluetooth device can be referred to as "A2DP sink". Another device communicates with the electronic device through the OPP transmission protocol. In the timing diagram of the electronic device shown in FIG. 1, the A2DP time period is the time period during which the electronic device transmits data packets to the Bluetooth device, and the OPP time period is the time period during which the electronic device transmits data packets to the another device. In the time diagram of the Bluetooth device, the A2DP time period is the time period during which the Bluetooth device receives the data packets from the electronic devices, and the OPP time period is the time period during which the Bluetooth device receives the data packets from the another device.

When an A2DP time period of the electronic device overlaps with an A2DP time period of the Bluetooth device, the audio data packet can be transmitted normally. In FIG. 1, there are less overlapped time between the A2DP time periods of the electronic device and the A2DP time periods of the Bluetooth device, so the bandwidth of the electronic device and the Bluetooth device is wasted, and the transmission of the another device may be affected.

In order to solve the above problems, the present application provides a Bluetooth-based data transmission method. The Bluetooth-based data transmission method comprises: establishing a communication connection with a second device; determining a sniff interval and transmitting indication information of the sniff interval to the second device; entering a sniff mode; transmitting data packets to the second device in the sniff interval. In an embodiment, the transmission duration of the first data packet is longer than or equal to two time slots.

In an embodiment, the sniff interval is the time period for a slave device to wake up regularly to monitor information from a master device, that is, every the time period, the slave device wakes up to monitor the information of the master device.

In an embodiment, the first device may be a master device, and the second device may be a slave device. In the case, the first device may start to transmit a data packet in an even time slot and then receive a response message (ACK or NACK) which is transmitted from the second device in response to the data packet in the next odd time slot which is present after the transmission of the data packet is finished.

Alternatively, the first device may be a slave device, and the second device may be a master device. In the case, the first device may start to transmit a data packet in an odd time slot, and then receives a response message (ACK or NACK) from the second device in response to the data packet in the next even time slot which is present after the transmission of the data packet is finished. In one manner, the second device first transmits an empty packet, such as a polling packet, in an even time slot, and after receiving the empty packet, the first device starts to transmit a data packet in an odd time slot.

The following embodiments in FIG. 2-FIG. 8 are described with an example in which the first device is a master device and the second device is a slave device.

Figure 2:
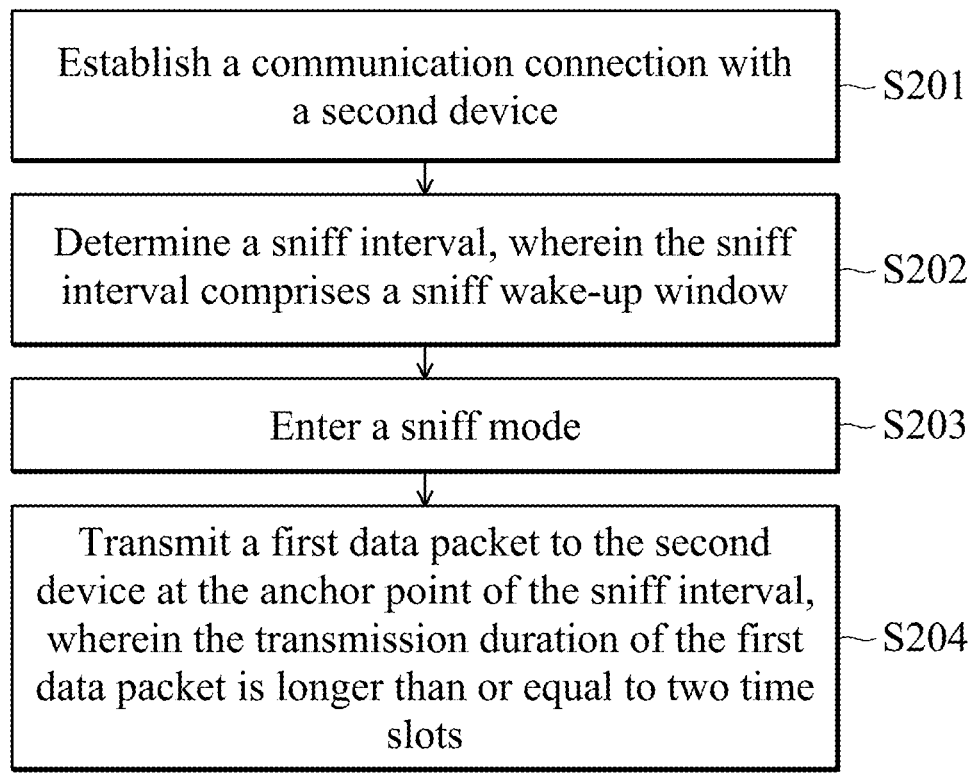
FIG. 2 is a schematic flowchart of a first embodiment of a Bluetooth-based data transmission method according to the present application.
Figure 3:
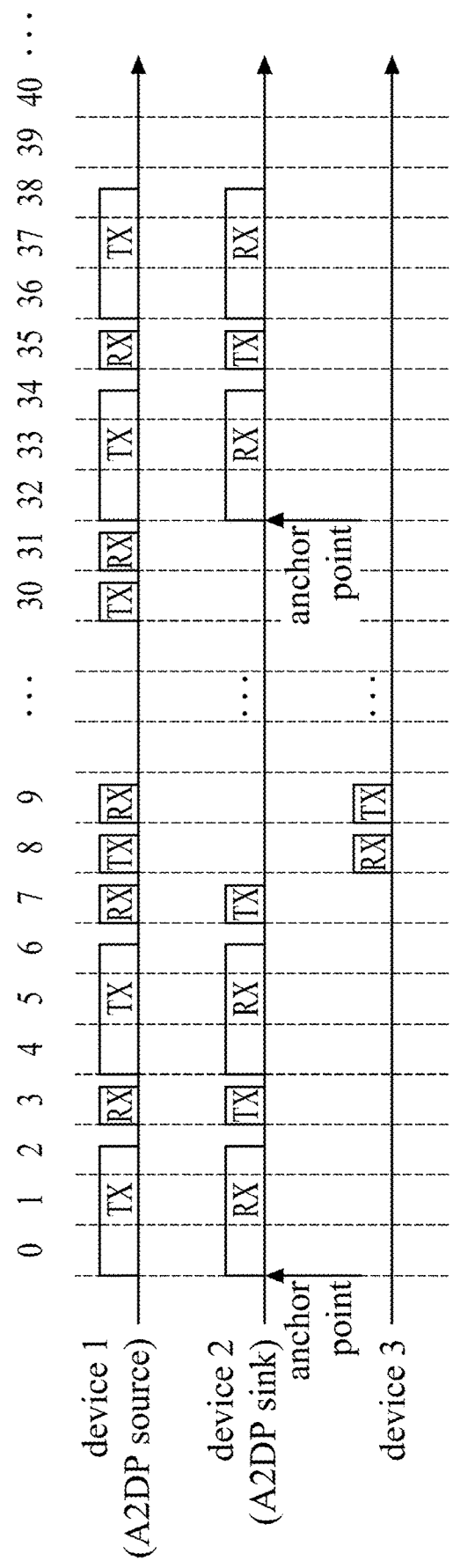
FIG. 3 is a timing diagram of multi-link transmission according to the present application.

Please refer to FIG. 2 and FIG. 3. FIG. 2 is a schematic flowchart of a first embodiment of a Bluetooth-based data transmission method according to the present application, and FIG. 3 is a timing diagram of multi-link transmission according to the present application. The Bluetooth-based data transmission method of the embodiment is applied on an electronic device, such as a first device. The electronic device may be a terminal device, such as a smart phone, a tablet computer, a notebook computer, a computer or a wearable device, and the second device connected to the first device may be a wireless device, such as a Bluetooth headset and a Bluetooth speaker.

As shown in FIG. 2, the Bluetooth-based data transmission method of the embodiment comprises the following steps:

S201: Establish a communication connection with the second device.

In an embodiment, the first device can establish an ACL (Access Control List) link connection with the second device. In one embodiment, the initial communication connection between the first device and the second device can be preset to an active mode. The first device is the device 1 shown in FIG. 3, and the second device is the device 2 shown in FIG. 3.

S202: Determine a sniff interval, wherein the sniff interval comprises a sniff wake-up window, and the indication information of the sniff interval is transmitted to the second device.

In an embodiment, after the communication connection between the first device and the second is established, the information of the data packet that needs to be transmitted to the second device is obtained. For example, when the second device is a Bluetooth device, the first device obtains the information of the audio data packets to be transmitted to the Bluetooth device.

In an embodiment, the first device may determine the sniff interval according to the information of the data packet to be transmitted to the second device. The information of the data packet comprises the generation time interval of the data packet. The sniff interval can be a multiple of the generation time interval of the data packet.

Specifically, the first device generates a data packet and determines the sniff interval according to the generation time interval of the data packet. For example, if one A2DP data packet is generated every 20 ms, the sniff interval can be determined to be 20 ms, or the sniff interval can be determined to be 40 ms. When the sniff interval is 20 ms, one A2DP data packet needs to be transmitted in the sniff wakeup window. When the sniff interval is 40 ms, two A2DP data packets need to be transmitted in the sniff wakeup window. In one example, a sniff interval is from the time slot 0 to the time slot 31 in FIG. 3. The generation time interval of the data packet is the time interval between the respective time points at which two successive data packets are generated when the original data stream is encoded to generate multiple successive data packets, such as the time interval between the time point at which the first data packet is generated and the time point at which the second data packet is generated.

In an embodiment, when the generation time interval of the A2DP data packet is longer, the bit rate of the A2DP data packet is less; the generation time interval of the A2DP data packet is shorter, the bit rate of the A2DP data packet is greater. The bit rate may be obtained by the negotiation between the first device and the second device. When the bit rate is greater, the sound quality played by the second device which receives the data packet is better; when the bit rate less, the sound quality played by the second device which receives the data packet is worse.

Further, the sniff interval comprises a sniff wake-up window. In one embodiment, the starting time point of the sniff interval is the same as the starting time point of the sniff wake-up window. The sniff wake-up window is the communication transmission time of the data packet between the first device and the second device. In the sniff interval except for sniff wake-up window, the second device can enter the suspended state or the sleep state, which reduces the workload of the second device and frees up CPU processing resources. The length of the sniff wake-up window is variable.

Optionally, in the step, the first device may receive the sniff interval suggested by the second device and determine the sniff interval according to the information of the data packet to be transmitted to the second device. If the sniff interval suggested by the second device basically matches the sniff interval determined by the first device, the sniff interval determined in Step S201 may be the sniff interval suggested by the second device, and the first device transmits the indication information indicating the usage of the sniff interval suggested by the second device to the second device. If the sniff interval suggested by the second device does not match the sniff interval determined by the first device, the first device transmits indication information indicating the sniff interval determined by itself. The substantially matching between the sniff interval suggested by the second device and the sniff interval determined by the first device means that the difference between the sniff interval suggested by the second device and the sniff interval determined by the first device is within a predetermined time range.

S203: Enter a sniff mode (breathing mode).

In an embodiment, the ACL link connection mode between the first device and the second device is switched from the active mode to the sniff mode.

S204: Transmit a first data packet to the second device at the anchor point of the sniff interval, wherein the transmission duration of the first data packet is longer than or equal to two time slots.

The anchor point of the sniff interval may be referred to as "sniff anchor point". In the timing diagram of FIG. 3, the first device transmits the first data packet based on the A2DP transmission protocol in the duration of the time slot 0-the time slot 2, and the second device receives the first data packet in the duration of the time slot 0-the time slot 2. In the embodiment, the first device starts to transmit a data packet to the second device in an even time slot. As shown in FIG. 3, the first device transmits data packets to the second device in the time slot 0 and the time slot 4. The first device receives a response message (ACK or NACK) from the second device in response to the transmitted data packet in the next odd time slot which is present after the transmission of the data packet is finished. As shown in FIG. 3, the first device receives response messages (ACK or NACK) from the second device in response to the transmitted data packets in the time slot 3 and the time slot 7.

By setting the sniff interval, the embodiment of the present invention arranges the starting time of the communication transmission between the first device and the second device. For example, at the anchor point of the sniff interval, it can effectively ensure that the transmission of the first device and the reception of the second device are synchronized and save bandwidth resources. The transmission duration of the first data packet is longer than or equal to two time slots. Thus, the amount of data for each data transmission can be increased, which is beneficial to improve the efficiency of data transmission.

Figure 4:
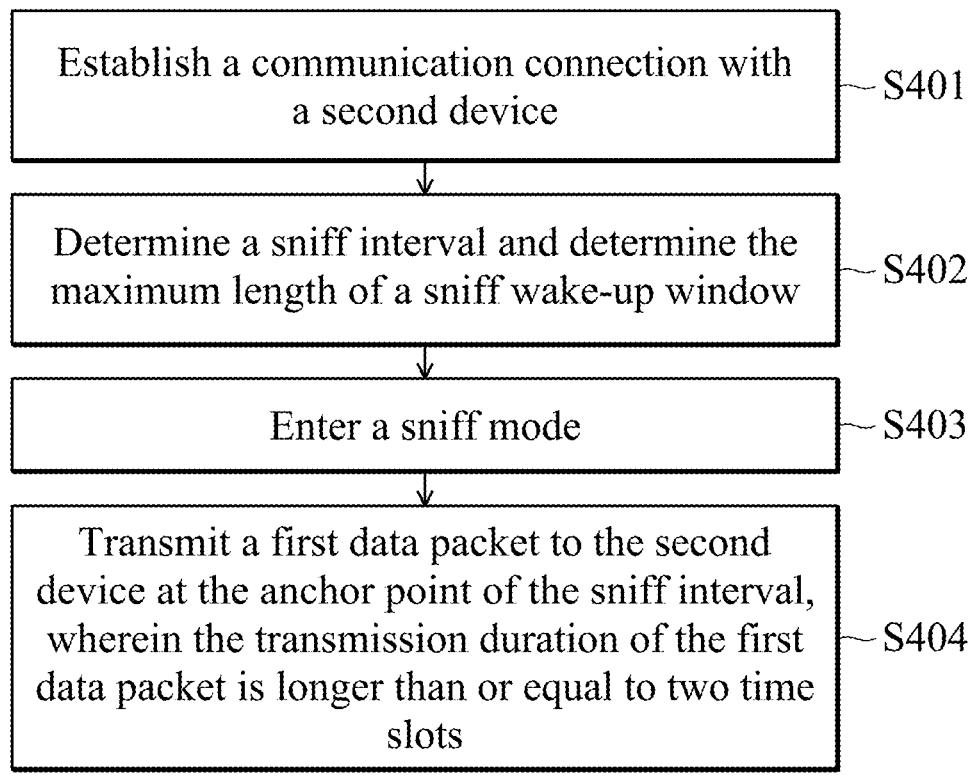
FIG. 4 is a schematic flowchart of a second embodiment of a Bluetooth-based data transmission method according to the present application.

In an embodiment, the sniff wake-up window in the first sniff interval may or may not have the maximum length. When the sniff wake-up window in the first sniff interval has a maximum length, the maximum length may be a preset length, or may be determined by the first device before entering the sniff mode. The maximum length of the sniff wake-up window refers to the maximum duration in which data communication can be carried out in the sniff interval. If the first device has no data packets to be transmitted in the sniff interval, the sniff wake-up window can be ended before the maximum duration is reached. Please continue to refer to FIG. 4. FIG. 4 is a schematic flowchart of a second embodiment of a Bluetooth-based data transmission method according to the present application. Specifically, the Bluetooth-based data transmission method comprises the following steps:

S401: Establish a communication connection with the second device.

S402: Determine a sniff interval and determine the maximum length of a sniff wake-up window, wherein the sniff interval comprises the sniff wake-up window.

The way of determining the sniff interval can be the same as that of the first embodiment and will not be repeated here.

Optionally, the first device can determine the maximum length of the sniff wake-up window in the sniff interval based on the predetermined number of data packets to be transmitted in one sniff interval, the transmission duration of each data packet to be transmitted, and the number of re-transmissions of each data packet to be transmitted. In this case, the maximum length of the sniff wake-up window is longer than the sum of the transmission durations of the respective data packets to be transmitted and the re-transmission durations of the respective data packets to be transmitted in the sniff interval, wherein the re-transmission duration of a data packet to be transmitted is equal to the product of the number of re-transmissions of the data packet to be transmitted and the transmission duration of the data packet to be transmitted. For example, if the generation time interval of the data packet is 20 ms and the sniff interval is 40 ms, it is necessary to transmit two data packets in a sniff wake-up window. In this case, the maximum length of the sniff wake-up window should be longer than: (the number of data packets to be transmitted)*(the transmission duration) plus (the number of data packets to be transmitted)*(the re-transmission duration). For example, assuming that the number of re-transmissions is 1 and that the estimated duration in which the first device transmits a data packet to the second device and receives a response message from the second device is 3.75 ms, then that the estimated duration in which the first device re-transmits the data packet and receives a response message in response to the re-transmitted data packet is also 3.75 ms. Assuming that the first device needs to transmit two data packets in the sniff wake-up window, the maximum length of the sniff wakeup window needs to be longer than 15 ms.

S403: Enter sniff mode.

S404: Transmit a first data packet to the second device at the anchor point of the sniff interval, wherein the transmission duration of the first data packet is longer than or equal to two time slots.

Figure 5:
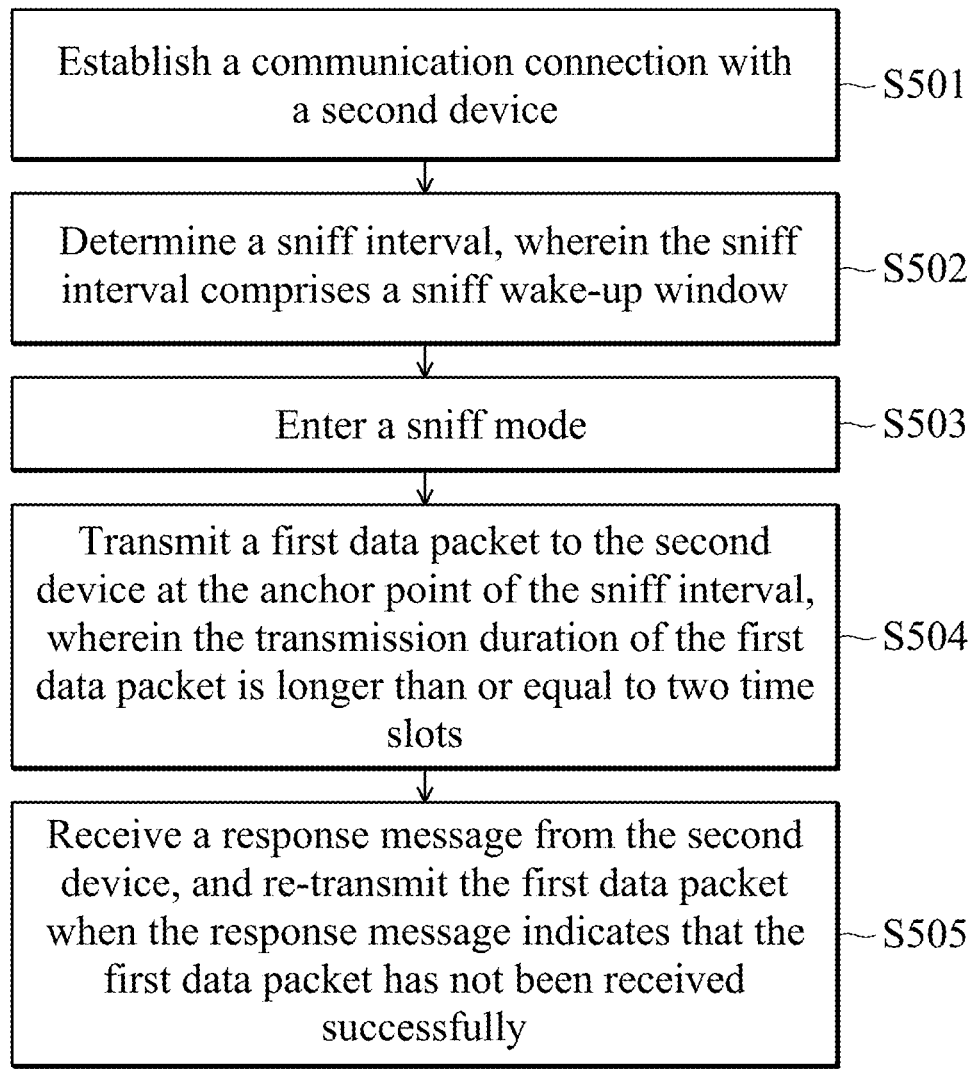
FIG. 5 is a schematic flowchart of the third embodiment of the Bluetooth-based data transmission method according to the present application.

Please continue to refer to FIG. 5. FIG. 5 is a schematic flowchart of the third embodiment of the Bluetooth-based data transmission method according to the present application. Specifically, the Bluetooth-based data transmission method comprises the following steps:

Step S501-Step S504 are similar to Step S201-Step S204 or similar to Step S401-Step S404, and they will not be repeated here.

S505: Receive a response message from the second device, and re-transmit the first data packet in the sniff wake-up window when the response message indicates that the first data packet has not been received successfully.

In an embodiment, the first device starts to transmit data packet 1 to the second device in an even time slot (for example, the anchor point) and then receives a response message which is transmitted by the second device in response to the data packet 1 in the next odd time slot which is present after the transmission of the data packet is finished. When the response message indicates that the second device has not received the data packet 1 successfully, the first device starts re-transmitting the data packet 1 to the second device in the next even time slot after the above odd time slot. For example, in the timing diagram of FIG. 3, the first device transmits the data packet 1 based on the A2DP transmission protocol in three time slots (time slot 0~time slot 2), and the second device receives the data packet 1 in the three time slots (time slot 0~time slot 2). The first device receives the response message from the second device in the time slot 3 in FIG. 3. When the response message indicates that data packet 1 has not been received successfully (that is, the NACK information), which means that the previous transmission of the data packet 1 has failed, then the first device re-transmits the data packet 1 (that is, the first device re-transmits the data packet 1 in three time slots (time slot 4-time slot 6).

Figure 6:
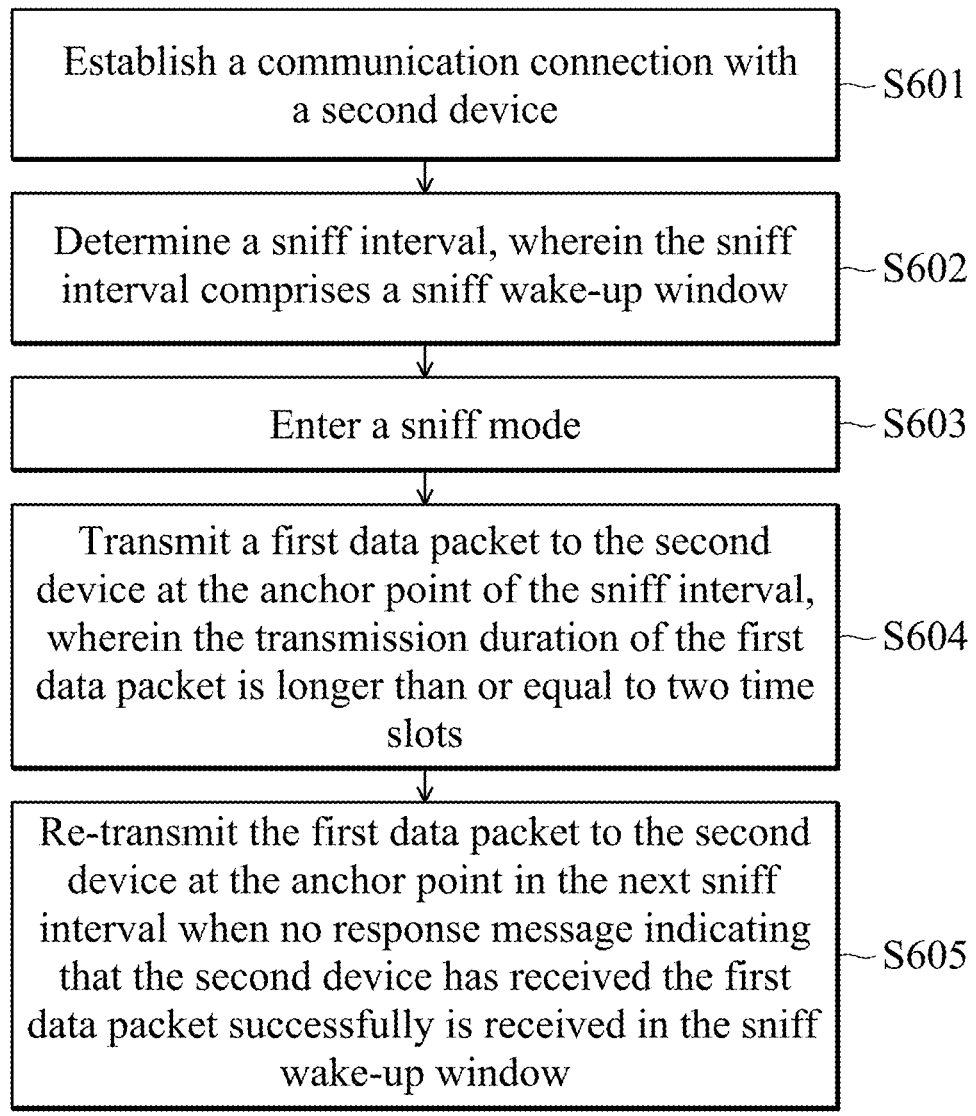
FIG. 6 is a schematic flowchart of a fourth embodiment of a Bluetooth-based data transmission method according to the present application.

Please continue to refer to FIG. 6. FIG. 6 is a schematic flowchart of a fourth embodiment of a Bluetooth-based data transmission method according to the present application. Specifically, the Bluetooth-based data transmission method comprises the following steps:

Step S601-Step S604 are similar to Step S201-Step S204 or similar to Step S401-Step S404, and they will not be repeated here.

S605: re-transmit the first data packet to the second device at the anchor point in the next sniff interval when no response message indicating that the second device has received the first data packet successfully is received in the sniff wake-up window.

For example, in the timing diagram of FIG. 3, the first device transmits the data packet 1 based on the A2DP transmission protocol in three time slots (time slot 0-time slot 2), and the second device receives the data packet 1 in the three time slots (time slot 0-time slot 2). The first device receives the response message from the second device in the time slot 3 in FIG. 3. When the response message indicates that data packet 1 has not been received successfully (that is, the NACK information), which means that the previous transmission of the data packet 1 has failed, then the first device re-transmits the data packet 1 (that is, the first device re-transmits the data packet 1 in three time slots (time slot 4-time slot 6)). The first device receives the response message from the second device in the time slot 7 in FIG. 3. When the response message indicates that the data packet 1 has not been received successfully and the maximum length of the sniff wake-up window has been reached, the first device re-transmits the data packet 1 at the anchor point of the next sniff interval. For example, the data packet 1 that is received unsuccessfully in the sniff interval is re-transmitted at the time slot 32 in FIG. 3, so as to ensure that the data between the first device and the second device can be complete and received successfully.

For another example, in the timing diagram of FIG. 3, the first device transmits the data packet 1 based on the A2DP transmission protocol in three time slots (time slot 0-time slot 2), and the second device receives the data packet 1 in the three time slots (time slot 0-time slot 2). The first device receives the response message from the second device in time slot 3 in FIG. 3. When the response message indicates that the data packet 1 has been received successfully (that is, the ACK information), which means that the previous transmission of the data packet 1 is successful, then the first device transmits the data packet 2 (that is, the data packet 2 is transmitted in three time slots (time slot 4-time slot 6)). The first device receives the response message from the second device in the time slot 7 in FIG. 3. When the response message indicates that data packet 2 has not been received successfully and the maximum length of the sniff wake-up window has been reached, the first device re-transmits the data packet 2, which is transmitted unsuccessfully in the sniff interval, at the anchor point of the next sniff interval (this is, the time slot 32 in FIG. 3), so as to ensure that the data between the first device and the second device can be complete and received successfully.

Figure 7:
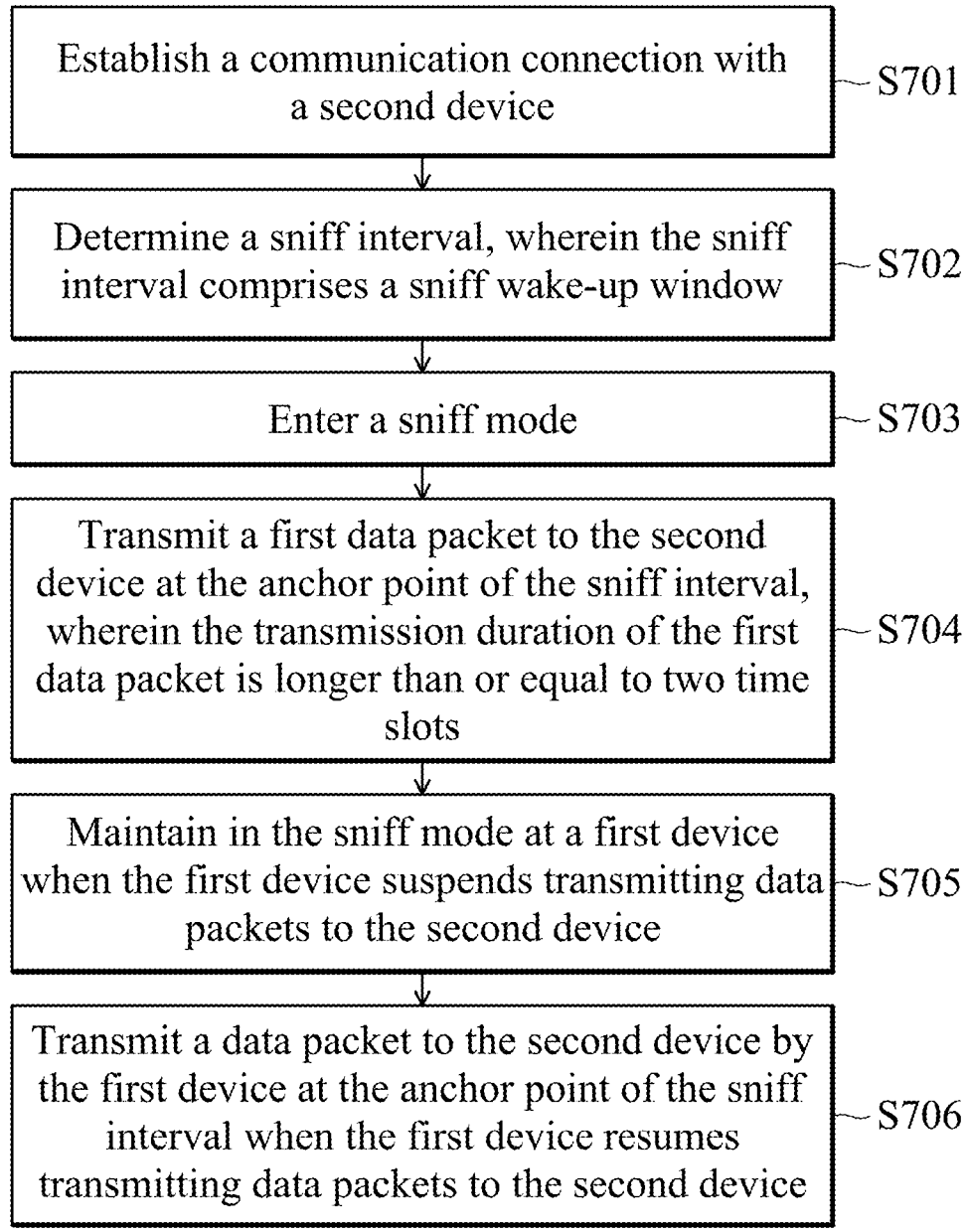
FIG. 7 is a schematic flowchart of a fifth embodiment of a Bluetooth-based data transmission method according to the present application.

Please continue to refer to FIG. 7. FIG. 7 is a schematic flowchart of a fifth embodiment of a Bluetooth-based data transmission method according to the present application. Specifically, the Bluetooth-based data transmission method comprises the following steps:

Step S701-Step S704 are similar to Step S201-Step S204 or similar to Step S401-Step S404, and they will not be repeated here.

S705: When the first device suspends transmitting data packets to the second device, the first device maintains in the sniff mode.

S706: When the first device resumes transmitting data packets to the second device, the first device transmits a data packet to the second device at the anchor point of the sniff interval.

As the above description, the first device maintains in sniff mode when the first device suspends transmitting data packets to the second device. Thus, when the first device resumes transmitting data packets to the second device, the first device can use the previously determined sniff interval and sniff wake-up window, without re-determining the sniff interval and sniff wake-up window, so that when the first device resumes transmitting data packets to the second device, it can immediately transmit data to the second device.

Figure 8:
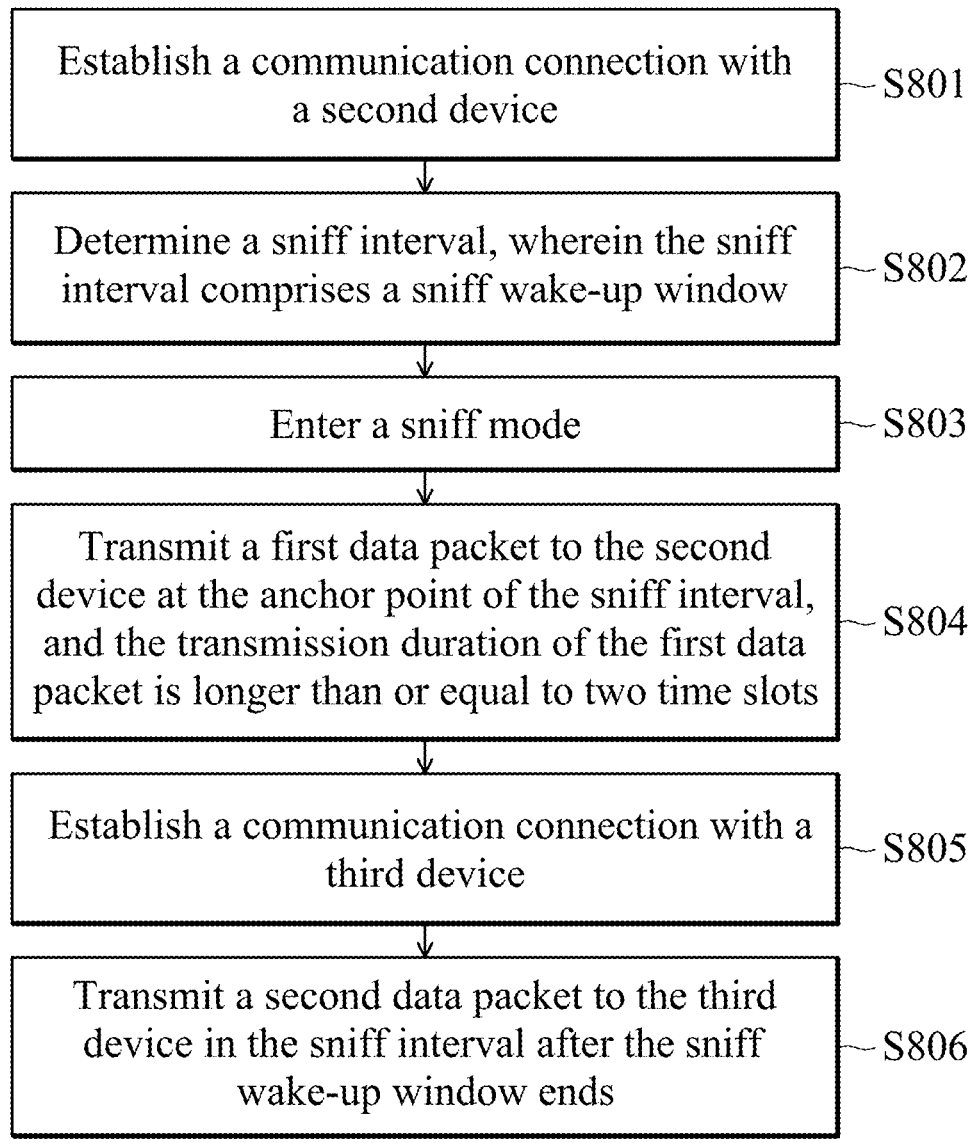
FIG. 8 is a schematic flowchart of a sixth embodiment of a Bluetooth-based data transmission method according to the present application.

Please continue to refer to FIG. 8. FIG. 8 is a schematic flowchart of a sixth embodiment of a Bluetooth-based data transmission method according to the present application. Specifically, the Bluetooth-based data transmission method comprises the following steps:

S801: Establish a communication connection with the second device.

S802: Determine a sniff interval and the maximum length of a sniff wake-up window, wherein the sniff interval comprises the sniff wake-up window, and the indication information of the sniff interval is transmitted to the second device.

S803: Enter a sniff mode.

S804: Transmit a first data packet to the second device at the anchor point of the sniff interval, and the transmission duration of the first data packet is longer than or equal to two time slots.

S805: Establish a communication connection with a third device.

In an embodiment, the third device is the device 3 in FIG. 3. The first device can establish an ACL (Access Control List) link connection with the third device. After the ACL link connection is established, the communication between the first device and the third device may be switched to the sniff mode (breathing mode), or the communication connection between the first device and the third device may maintain in the active mode.

S806: Transmit a second data packet to the third device in the sniff interval after the sniff wake-up window ends.

In an embodiment, the first device may transmit data packets to the third device after the sniff wake-up window ends and before the anchor point of the next sniff interval is present. For example, the first device may transmit data packets to the third device in the duration from the time slot 8 to the time slot 31 in FIG. 3.

Optionally, the first device can flexibly adjust the type of the data packets according to the interference situation in the environment. In the case where the interference is relatively small, the first device may select data packets of a first data type, such as data packets of 3-DH5. In the case where the interference is relatively large, the first device may select data packets of a second data type, such as data packets of 2-DH5, where a data packet of the first data type carries more data than a data packet of the second data type.

Figure 9:
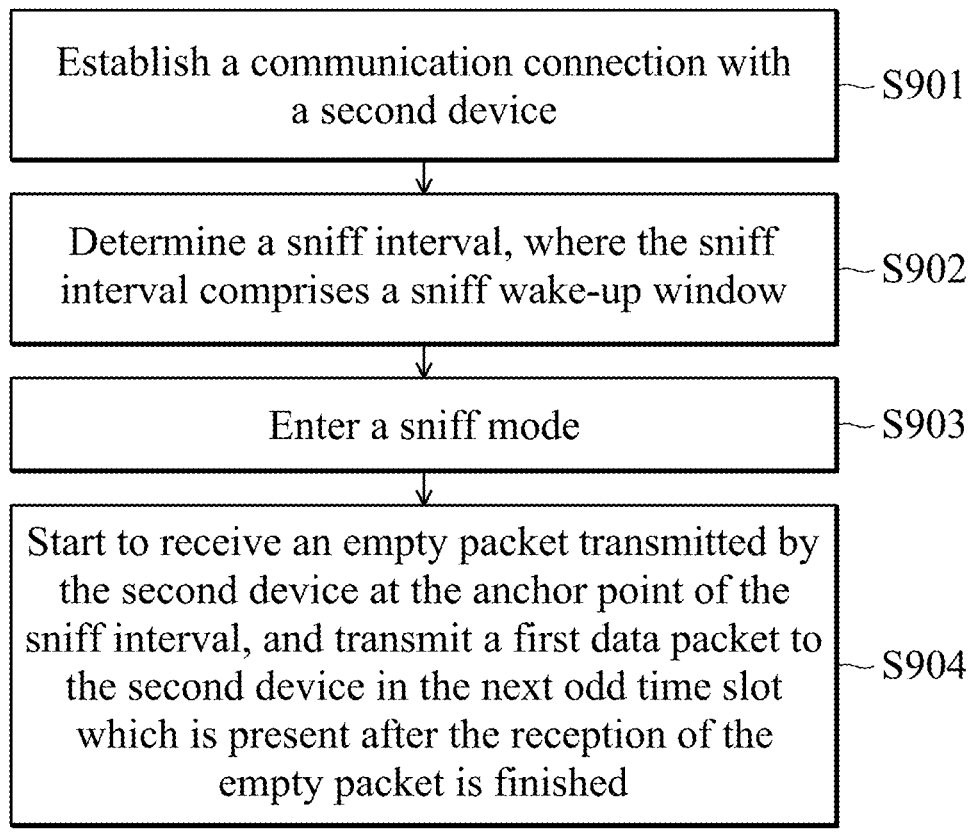
FIG. 9 is a schematic flowchart of a seventh embodiment of a Bluetooth-based data transmission method according to the present application.

The following embodiment in FIG. 9 is described by taking the first device as a slave device and the second device as a master device as an example. The main different between the case where the first device is a slave device and the second device is a master and the previous case where the first device is a master and the second device is a slave device is that the first device can start transmitting a data packet in an odd time slot and receive a response message which is transmitted by the second device in response to the data packet in the next even time slot which is present after the transmission of the data packet finished. The Bluetooth-based data transmission method comprises the following steps:

S901: Establish a communication connection with the second device.

S902: Determine a sniff interval, where the sniff interval comprises a sniff wake-up window, and the indication information of the sniff interval is transmitted to the second device.

S903: Enter a sniff mode.

S904: Start to receive an empty packet transmitted by the second device at the anchor point of the sniff interval, such as Poll, and transmit a first data packet to the second device in the next odd time slot which is present after the reception of the empty packet is finished. The transmission duration of the first data packet is longer than or equal to two time slots.

Figure 10:
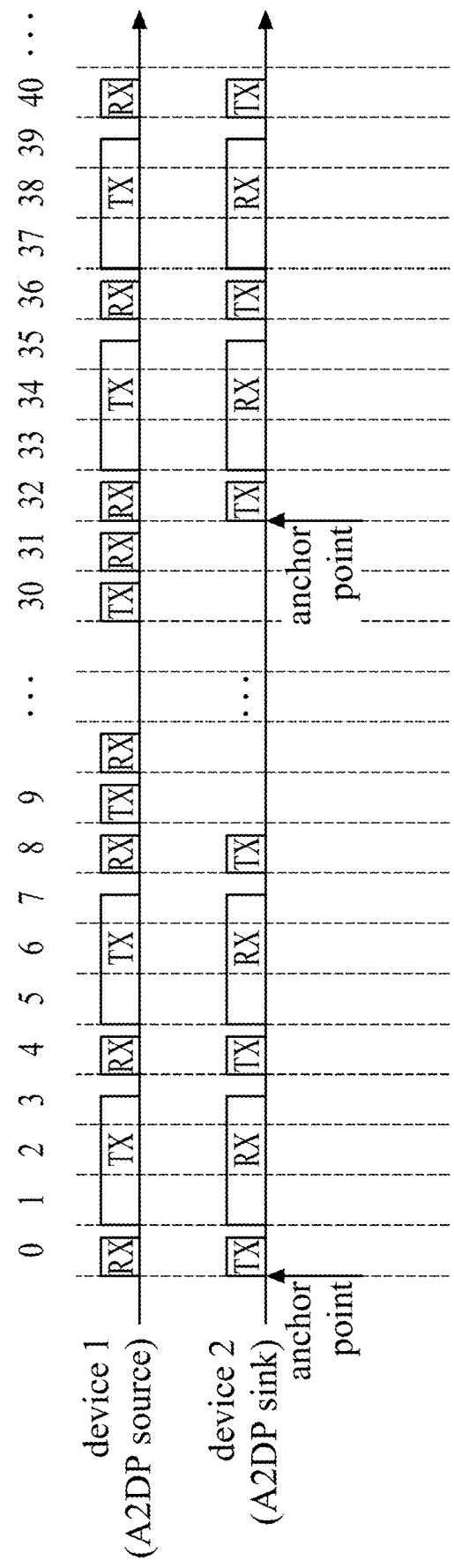
FIG. 10 is a timing diagram of multi-link transmission based on the embodiment of FIG. 9.

As shown in FIG. 10, the first device is a slave device. The device receives an empty packet transmitted by the second device in the time slot 0 of the sniff interval, starts to transmit a data packet 1 to the second device in the time slot 1, and receives a response message which is transmitted by the second device in response to the data packet 1 in the next even time slot (that is, the time slot 4) which is present after the transmission of the data packet 1 is finished. If the response message is ACK, the first device starts to transmit a data packet 2 to the second device in the time slot 5 and receives a response message which is transmitted by the second device in response to the data packet 2 in the next even time slot (that is, the time slot 8) which is present after the transmission of the data packet 2 is finished. If the response message is NACK, the first device starts re-transmitting the data packet 1 to the second device in the time slot 5 and receives a response message which is transmitted by the second device in response to the re-transmitted data packet 1 in the next even time slot (that is, the time slot 8) which is present after the re-transmission of the data packet 1 is finished.

Figure 11:
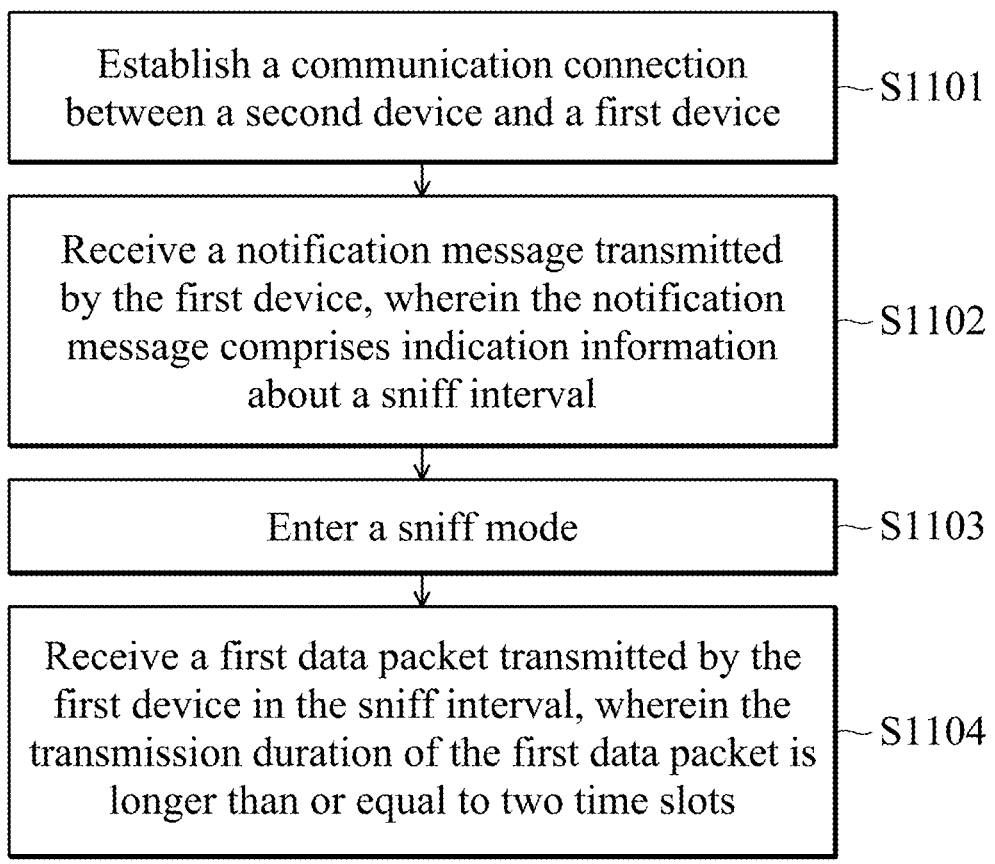
FIG. 11 is a schematic flowchart of a first embodiment of a Bluetooth-based data receiving method according to the present application.

The present application provides a Bluetooth-based data receiving method. Please refer to FIG. 11, which is a schematic flowchart of a first embodiment of a Bluetooth-based data receiving method according to the present application. The Bluetooth-based data receiving method of the embodiment is applied on a second device, such as a Bluetooth device. The second device may be a wireless device such as a Bluetooth headset or a Bluetooth speaker.

As shown in FIG. 1, the Bluetooth-based data receiving method of the embodiment specifically comprises the following steps:

S1101: The second device establishes a communication connection between a second device and the first device.

S1102: The second device receives a notification message transmitted by the first device, wherein the notification message comprises indication information of a sniff interval and indication information of a sniff wake-up window. Optionally, the notification message further comprises indication information of the maximum length of the sniff wake-up window.

S1103: Enter a sniff mode;

S1104: Receive a first data packet transmitted by the first device in the sniff interval. The transmission duration of the first data packet is longer than or equal to two time slots.

The first device may be a master device, and the second device may be a slave device. In this case, in this case, the second device can start receiving a data packet in an even time slot and can transmit a response message (ACK or NACK) in response to the data packet in the next odd time slot which is present after the reception of the data packet is finished. For example, the second device starts to receive the first data packet at the anchor point of the sniff interval.

Alternatively, the first device may be a slave device, and the second device may be a master device. In this case, the second device may start receiving a data packet in an odd time slot and transmit a response message (ACK or NACK) in response to the data packet in the next even time slot which is present after the reception of the data packet is finished. For example, the second device starts to receive the first data packet in the time slot 1. In an embodiment, before the second device starts to receive the first data packet in the time slot 1, the second device transmits an empty packet, such as a poll packet, to the first device.

Figure 12:
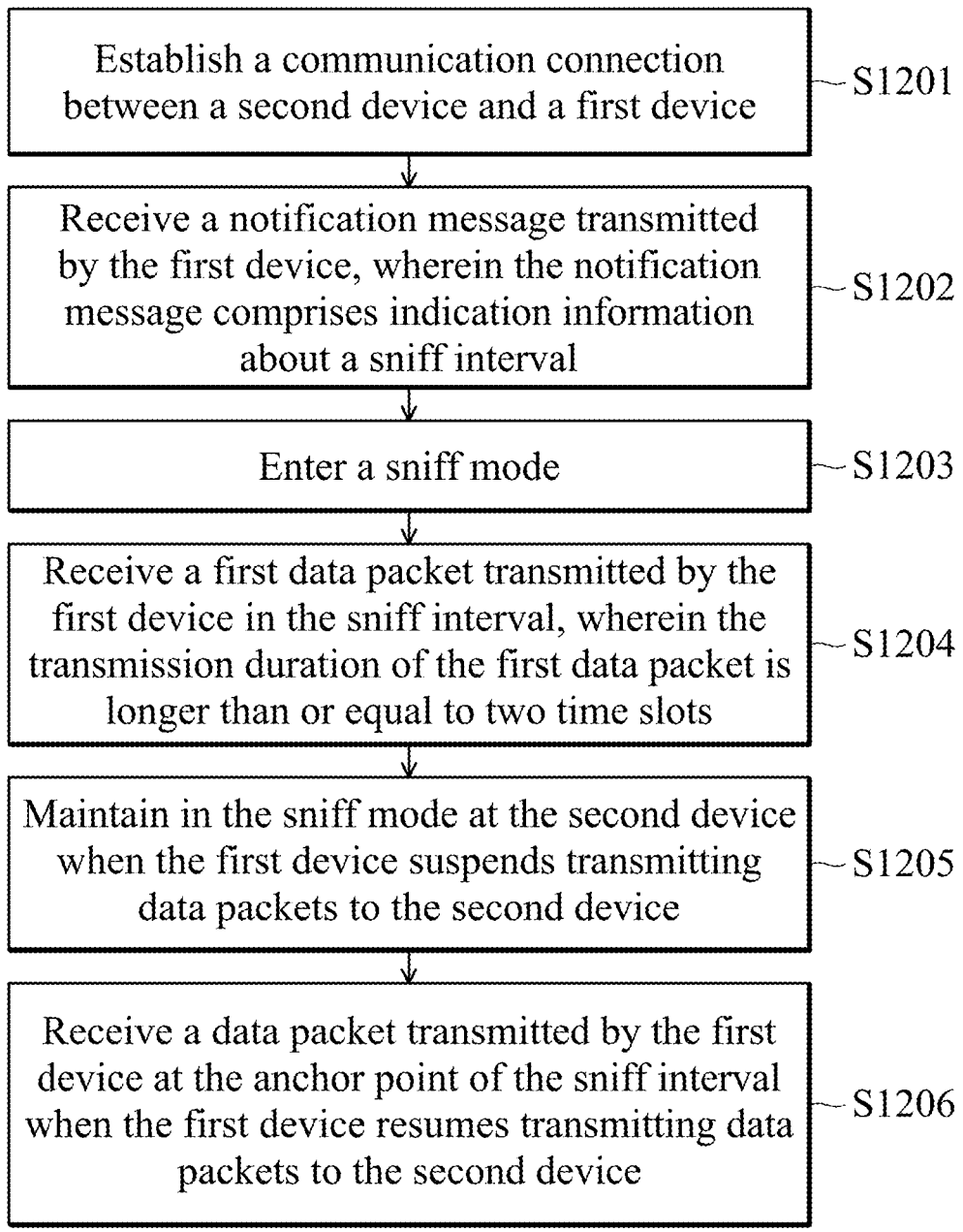
FIG. 12 is a schematic flowchart of a second embodiment of a Bluetooth-based data receiving method according to the present application.

Please continue to refer to FIG. 12. FIG. 12 is a schematic flowchart of a second embodiment of a Bluetooth-based data receiving method according to the present application. In this embodiment, the first device is the master device and the second device is the slave device. Specifically, the Bluetooth-based data receiving method comprises the following steps:

Steps S1201-S1204 are similar to Steps S1101-S1104, and they will not be repeated here.

S1205: When the first device suspends transmitting data packets to the second device, the second device maintains in the sniff mode.

S1206: When the first device resumes transmitting data packets to the second device, the second device receives a data packet transmitted by the first device at the anchor point of the sniff interval.

Optionally, in the case where the first device is a slave device and the second device is a master device, in Step S1206, when the first device resumes transmitting data packets to the second device, the second device starts to receive a data packet, which is transmitted by the first device, in an odd time slot of the sniff intervals.

Figure 13:
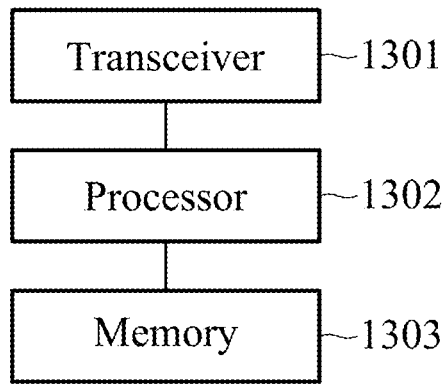
FIG. 13 is a schematic structural diagram of an embodiment of a communication device according to the present application.

In order to implement the Bluetooth-based data transmission method of the above embodiment, the present application proposes a communication device. Please refer to FIG. 13, which is a schematic structural diagram of an embodiment of a communication device according to the present application. As shown in FIG. 13, the communication device 1300 of the embodiment may comprise a transceiver 1301 and a processor 1302.

The transceiver 1301 is configured to establish a communication connection with the second device;

The processor 1302 determines a sniff interval which comprises a sniff wake-up window, enters a sniff mode, and notifies the indication information of the sniff interval and the indication information of the sniff wake-up window through the transceiver, and transmits a first data packet to the second device in the sniff interval. The transmission duration of the first data packet is longer than or equal to two time slots.

In an embodiment, the communication device may be a master device, and the second device may be a slave device. In this case, the communication device may start transmitting a data packet in an even time slot and receive a response message (ACK or NACK) which is transmitted by the second device in response to the data packet in the next odd time slot which is after the transmission of the data packet is finished. For example, the communication device starts to transmit the first data packet at the anchor point.

Alternatively, the communication device may be a slave device, and the second device may be a master device. In this case, the communication device may start transmitting a data packet in an odd time slot and receive a response message (ACK or NACK) which is transmitted by the second device in response to the data packet in the next even time slot which is after the transmission of the data packet is finished.

The communication device may also comprise: a memory 1303. The memory 1303 stores a computer program, and the processor 1302 may operate to execute the computer program to implement the above operations.

In an embodiment, for the determination of the sniff interval, the processor 1302 determines the sniff interval according to the information of the data packet to be transmitted to the second device. The information of the data packet to be transmitted comprises the generation time interval of the data packet to be transmitted. The sniff interval is a multiple of the generation time interval of the data packet.

Optionally, the processor 1302 is further capable of determining the maximum length of the sniff wake-up window based on the predetermined number of data packets to be transmitted, the transmission duration of each data packet to be transmitted, and the number of re-transmissions of each data packet to be transmitted. The maximum length of the sniff wake-up window is longer than the sum of the transmission durations of the respective data packets to be transmitted in the sniff interval and the re-transmission durations of respective data packets to be transmitted. The re-transmission duration of the data packet to be transmitted is equal to the product of the number of re-transmissions of the data packet to be transmitted and the transmission duration of the data packet to be transmitted. Determining the maximum length of the sniff wake-up window can make the sniff wake-up window end when the maximum length is reached. Based on this method, communication with other communication devices can be achieved during the time excluding the sniff wake-up window in the sniff interval, so that the first device can communicate with other communication devices in time even when the first device establishes multiple links.

Optionally, the processor is further capable of maintaining in the sniff mode when suspending transmitting data packets to the second device. In response to the manner, the first device can use the previously determined sniff interval and sniff wake-up window when it resumes transmitting data packets to the second device, instead of re-determining the sniff interval and sniff wake-up window, so that when the first device resumes transmitting data packets to the second device, it can immediately send data to the second device.

Optionally, the transceiver is further configured to establish a communication connection with a third device. The processor is further configured to transmit a second data packet to the third device through the transceiver in the sniff interval after the sniff wake-up window ends. Based on the manner, the first device can communication with other communication devices in time when the first device establishes multiple links.

In another embodiment, the processor may also perform a re-transmission function for a data packet through the transceiver. In another case, when the processor transmits the data packet to the second device in an even time slot of the sniff interval, the processor receives a response message which is transmitted by the second device in response to the data packet in the next odd time slot which is present after the transmission of the data packet is finished. When the response message indicates that the data packet has not been received successfully, the data packet is re-transmitted in the next even time slot. In another case, when the processor transmits a data packet to the second device in an odd time of the sniff interval, the processor receives a response message which is transmitted by the second device in response to the data packet in the next even time slot which is present after the transmission of the data packet is finished. When the response message indicates the data packet has not been received successfully, the data packet is re-transmitted in the next odd time slot.

In an embodiment, the processor may also perform other functions of the first device in the above method embodiment through the transceiver, and details are not described herein again.

In the embodiment, the processor 1302 may also be referred to as a CPU (Central Processing Unit). The processor 1302 may be an integrated circuit chip with signal processing capability. In other embodiments, the processor 1302 may also be a general-purpose processor, a digital signal processor (DSP), a special integrated circuit (ASIC), a field programmable gate array (FPGA) or other programmable logic devices, discrete gates or transistor logic devices, discrete hardware components. The general-purpose processor may be a microprocessor, or the processor 1302 may also be any normal processor or the like.

Figure 14:
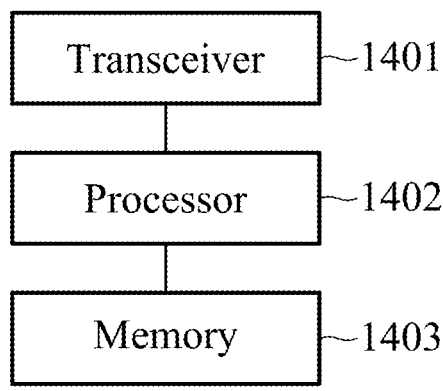
FIG. 14 is a schematic structural diagram of another embodiment of the communication device according to the present application.

In order to implement the Bluetooth-based data receiving method of the above embodiments, the present application provides a communication device. For details, please refer to FIG. 14. FIG. 14 is a schematic structural diagram of another embodiment of the communication device according to the present application. As shown in FIG. 14, a communication device 1400 of the embodiment may comprise a transceiver 1401 and a processor 1402.

The transceiver 1401 is configured to establish a communication connection with the first device;

The processor 1402 is configured to receive a notification message, which comprises indication information of a sniff interval, transmitted by the first device, enter a sniff mode, and receive a data packet transmitted by first second device in the sniff interval through the transceiver. The transmission duration of the data packet is longer than or equal to two time slots. The processor 1402 starts receives the data packet transmitted by the first device in an odd time slot of the sniff interval or starts to receive the data packet transmitted by the first device in an even time slot of the sniff interval.

The communication device 1400 may also comprise a memory 1403 which stores a computer program. The processor 1302 may be configured to execute the computer program to implement the above operations.

The processor in the communication device provided in this embodiment can perform the operations in each embodiment of the above-mentioned Bluetooth-based data receiving method through the transceiver, and the related description will not be repeated here.

Figure 15:
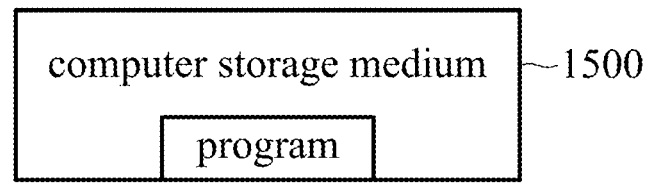
FIG. 15 is a schematic structural diagram of an embodiment of the computer storage medium according to the present application.

The present application also provides a computer storage medium. As shown in FIG. 15, a computer storage medium 1500 is configured to store a program. When the program is executed by the processor, the embodiment of the Bluetooth-based data transmission method of the present application or the embodiment of the Bluetooth-based data receiving method of the present application can be implemented.

The methods involved in the embodiments of the Bluetooth-based data transmission method of the present application exist in the form of software functional units when they are implemented, and can be stored in the device when they are sold or used as independent products, such as a computer readable the storage medium. Based on this understanding, the part of the technical solution of the present application that contributes to the previous technology or all or part of the technical solution can be embodied in a form of a computer software product. The computer software product is stored in a storage medium and comprises several instructions which enable a computer device (which can be a personal computer, a server, or a network device, etc.) or a processor to execute all or part of the steps in the various embodiments of the methods of the present invention. The aforementioned storage media comprise a U disk, a removable hard disk, a read-only memory (ROM), a random access memory (RAM), a magnetic disk, an optical disk, or any medium which can store program codes.

The above embodiments are only the exemplary implementation of the present application and do not intent to limit the scope of the present application. Any equivalent structure or equivalent process transformation which is made using the content of the specification and drawings of the present application, or any application in other related technical fields directly or indirectly using the content of the specification and drawings of the present application are all comprised in the scope of the patent protection of the present application.

What is claimed is:

1. A Bluetooth-based data transmission method applied to a first device, comprising:
    establishing a communication connection with a second device;
    entering a sniff mode;

transmitting a data packet to the second device in a sniff interval, wherein a transmission duration of the data packet is longer than or equal to two time slots, and the sniff interval comprises a sniff wake-up window, and the anchor point of the sniff interval is the beginning of the sniff wake-up window;

receiving a response message from the second device; and re-transmitting the data packet in the sniff wake-up window when the response message indicates that the data packet has not been received successfully;

wherein transmitting the data packet to the second device in the sniff interval comprises:

starting to transmit the data packet to the second device in an even time slot of the sniff interval; or starting to transmit the data packet to the second device in an odd time slot of the sniff interval.

2. The Bluetooth-based data transmission method as claimed in claim 1, further comprising: determining a sniff interval and transmitting indication information of the sniff interval to the second device, wherein determining the sniff interval comprises:

determining the sniff interval according to information of a data packet to be transmitted to the second device, wherein the information of the data packet to be transmitted comprises a generation time interval of the data packet to be transmitted, and wherein the sniff interval is a multiple of the generation time interval of the data packet to be transmitted.

3. The Bluetooth-based data transmission method as claimed in claim 1, the Bluetooth-based data transmission method further comprises:

determining a maximum length of the sniff wake-up window according to the predetermined number of data packets to be transmitted in the sniff interval, the transmission duration of each data packet to be transmitted, and the number of re-transmissions of each data packet to be transmitted, wherein the maximum length of the sniff wake-up window is longer than the sum of transmission durations of the respective data packets to be transmitted and re-transmission durations of the respective data packets to be transmitted in the sniff interval, and wherein the re-transmission duration of the data packet to be transmitted is equal to the product of the number of re-transmissions of the data packet to be transmitted and the transmission duration of the data packet to be transmitted.

4. The Bluetooth-based data transmission method as claimed in claim 1, wherein:

when the data packet is transmitted to the second device in an even time slot of the sniff interval, receiving the response message from the second device in the next odd time slot which is present after the transmission of the data packet is finished; and when the response message indicates that the data packet has not been received successfully, re-transmitting the data packet in the next even time slot; or when the data packet is transmitted to the second device in an odd time slot of the sniff interval, receiving the response message from the second device in the next even time slot which is present after the transmission of the data packet is finished; and when the response message indicates that the data packet has not been received successfully, re-transmitting the data packet in the next odd time slot.

5. The Bluetooth-based data transmission method as claimed in claim 1, the Bluetooth-based data transmission method further comprises:

when no response message indicating that the data packet has been received successfully by the second device in the sniff wake-up window, re-transmitting the data packet to the second device in the next sniff interval.

6. The Bluetooth-based data transmission method as claimed in claim 1, further comprising:

when suspending transmitting data packets to the second device, maintaining in the sniff mode.

7. The Bluetooth-based data transmission method as claimed in claim 1, the Bluetooth-based data transmission method further comprises:

establishing a communication connection with a third device; and transmitting a data packet of the third device to the third device in the sniff interval after the sniff wake-up window ends.

8. The Bluetooth-based data transmission method as claimed in claim 1, wherein transmitting the data packet to the second device in the sniff interval comprises:

transmitting the data packet to the second device in the sniff interval based on an advanced audio distribution profile (A2DP) transmission protocol.

9. The Bluetooth-based data transmission method as claimed in claim 1, wherein starting to transmit the data packet to the second device in the even time slot of the sniff interval comprises:

starting to transmit a first data packet to the second device at an anchor point of the sniff interval.

10. A Bluetooth-based data receiving method applied to a second device, comprising:

establishing a communication connection with a first device;

entering a sniff mode;

receiving a data packet transmitted by the first device in a sniff interval, wherein the transmission duration of the data packet is longer than or equal to two time slots, and the sniff interval comprises a sniff wake-up window, and the anchor point of the sniff interval is the beginning of the sniff wake-up window, when the second device has not received the data packet successfully, transmitting a response message indicating that the second device has not received the data packet successfully to the first device, and receiving the data packet which is re-transmitted by the first device in the sniff wake-up window;

wherein, receiving the data packet transmitted by the first device in the sniff interval comprises:

starting to receive the data packet transmitted by the first device in an odd time slot of the sniff interval; or starting to receive the data packet transmitted by the first device in an even time slot of the sniff interval.

11. The Bluetooth-based data receiving method as claimed in claim 10, further comprising:

maintaining in the sniff mode when the second device suspends receiving data packets from the first device.

12. The Bluetooth-based data receiving method as claimed in claim 10, wherein starting to receive the data packet transmitted by the first device in the even time slot of the sniff interval comprises:

starting to receive a first data packet transmitted by the first device at an anchor point of the sniff interval.

13. The Bluetooth-based data receiving method as claimed in claim 10, wherein:
- when the second device starts to receive the data packet transmitted by the first device in an even time slot of the sniff interval, the response message which is from the second device in response to the data packet is transmitted in the next odd time slot which is present after the reception of the data packet is finished, and the data packet which is re-transmitted by the first device is received in the next even time slot, or
- when the second device starts to receive the data packet transmitted by the first device in an odd time slot of the sniff interval, the response message which is in response to the data packet is transmitted in the next even time slot which is present after the reception of the data packet is finished, and the data packet which is re-transmitted by the first device is received in the next odd time slot.

14. A communication device comprising:
- a transceiver configured to establish a communication connection with a second device; and
- a processor coupled to the transceiver and configured to perform operations comprising:
- entering a sniff mode;
- starting to transmit a data packet to the second device in an even time slot of a sniff interval through the transceiver or starting to transmit the data packet to the second device in an odd time slot of the sniff interval through the transceiver,
- wherein the transmission duration of the data packet is longer than or equal to two time slots, and the sniff interval comprises a sniff wake-up window, and the anchor point of the sniff interval is the beginning of the sniff wake-up window,
- receiving a response message from the second device; and
- re-transmitting the data packet in the sniff wake-up window when the response message indicates that the data packet has not been received successfully.

15. The communication device as claimed in claim 14, wherein the processor is further configured to maintain in the sniff mode when suspending transmitting data packets to the second device.

16. The communication device as claimed in claim 14, wherein:
- when the processor is configured to start to transmit the data packet to the second device in an even time slot of the sniff interval, the processor is further configured to receive the response message from the second device through the transceiver in the next odd time slot which is present after the transmission of the data packet is finished, and when the response message indicates that the data packet has not been received successfully, the data packet is re-transmitted through the transceiver in the next even time slot, or
- when the processor is configured to start to transmit the data packet to the second device in an odd time slot of the sniff interval, the processor is further configured to receive the response message from the second device through the transceiver in the next even time slot which is present after the transmission of the data packet is finished, and when the response message indicates that the data packet has not been received successfully, the data packet is re-transmitted through the transceiver in the next odd time slot.

17. The communication device as claimed in claim 14, wherein the processor is further configured to start to transmit a first data packet to the second device at an anchor point of the sniff interval.

18. The communication device as claimed in claim 14, wherein the processor is further configured to determine the sniff interval according to information of a data packet to be transmitted to the second device, wherein the information of the data packet to be transmitted comprises a generation time interval of the data packet to be transmitted, and
  wherein the sniff interval is a multiple of the generation time interval of the data packet to be transmitted.

* * * * *